Patented Sept. 30, 1952

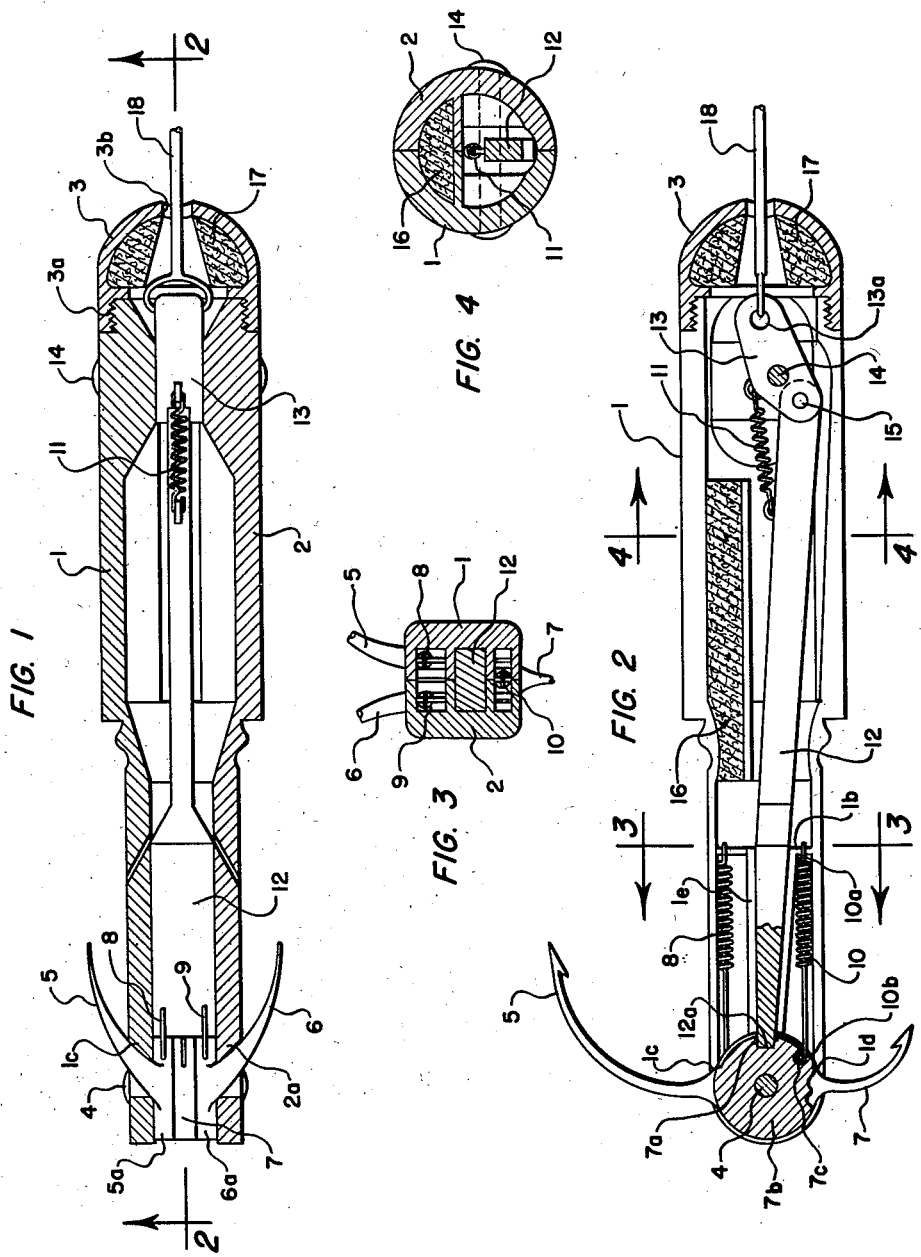

2,611,983

UNITED STATES PATENT OFFICE 2,611,983

RELEASABLE FISHING HOOK

Alfred W. Silva, San Diego, Calif.

Application November 24, 1950, Serial No. 197,470

4 Claims. (Cl. 43—42.06)

My invention relates to a releasable fishing hook, more particularly to improvements over my co-pending application Serial No. 134,026, filed December 20, 1949, and the objects of my invention are:

First, to provide a releasable fishing hook of this class particularly adapted for use in the commercial fishing industry, in which a plurality of hooks are locked by a common latch means, which is readily releasable from the mouth of a fish when tension in the fishing line is released;

Second, to provide a releasable fishing hook of this class having novel absorbent pads therein, adapted to contain fish oil or other scented material which serves as a lure to fish approaching said releasable fishing hook;

Third, to provide a releasable fishing hook of this class having novel arrangement of opposed pivotal hooks connected with a frame wherein a single latch bar is adapted to engage all of the hooks for holding the same while tension is maintained in the fishing line connected with said releasable fishing hook;

Fourth, to provide a releasable fishing hook of this class having a novel frame constructed of two pieces having vent means therethrough, adapted to promote a flow of water longitudinally of the hook for venting scent material from absorbent pads within the frame of the hook for luring fish in the wake thereof; and Fifth, to provide a releasable fishing hook of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a longitudinal sectional view of my releasable fishing hook, showing parts and portions thereof broken away and in section to facilitate the illustration; Fig. 2 is a longitudinal sectional view, taken on the line 2—2 of Fig. 1, showing parts and portions in elevation to facilitate the illustration; Fig. 3 is a transverse sectional view, taken on the line 3—3 of Fig. 2; and Fig. 4 is a transverse sectional view, taken from the line 4—4 of Fig. 2.

Similar characters of reference refer to similar parts and portions throughout the several views of the drawings.

The frame members 1 and 2, cap 3, rivet 4, hooks 5, 6 and 7, springs 8, 9, 10 and 11, latch bar 12, lever 13, pins 14 and 15, absorbent pads 16 and 17, and the line 18, constitute the principal parts and portions of my releasable fishing hook.

The frame members 1 and 2 form a hollow cylindrical casing, and these frame members 1 and 2, in assembly, provide an annular in cross-section casing, as shown in Fig. 4 of the drawings, and are separable along the middle portion of the releasable fishing hook. These frame members 1 and 2 are secured together by the rivet 4, the pin 14 and the cap 3, the cap being internally screw-threaded by means of screw-threads 3a on the forward end portions of the frame members 1 and 2, in surrounding relationship therewith, all as shown best in Fig. 1 of the drawings. The cap 3 is provided with an absorbent pad 17 therein, and an opening 3b in the forward end thereof communicating with said absorbent pad 17 and providing an opening through which the line 18 extends.

The frame members 1 and 2 are provided with a shelf portion 1a therein, on which the absorbent pad 16 is supported, rearwardly of the cap 3, all as shown best in Fig. 2 of the drawings. It will be noted that the absorbent pads 16 and 17 may be used to contain aromatic material, such as fish oil or the like.

Pivotally mounted on the pin 14, internally of the frame members 1 and 2, is the lever 13. This lever 13 is provided with an eye portion 13a, through which the line 18 is extended, and the opposite end of this lever 13 supports the pin 15, on which the latch bar 12 is pivotally mounted at its one end. The lever 13 and the latch bar 12 are interconnected by the spring 11, which tends to retract the latch bar 12 toward the pin 14. The opposite end of the latch bar 12 is provided with a flat latch portion 12a, adapted to project into the notch portions 7a in the hub 7b of the hook 7. This latch portion 12a of the latch bar 12 is also adapted to be projected into similar notches to the notch portion 7a, which are provided in the hubs 5a and 6a of the hooks 5 and 6, respectively.

The hooks 5, 6 and 7 are all pivotally mounted on the rivet 4, as shown best in Figs. 1 and 2 of the drawings. The spring 10 at its end 10a is secured to a bar portion 1b internally of the frame member 1, and the opposite end of said spring 10 is provided with a loop 10b positioned over a pin 7c in the hub 7b of the hook 7. The springs 8 and 9 are similarly connected with the hooks 5 and 6, respectively, whereby the springs 8, 9 and 10 tend to hold the hooks 5, 6 and 7, respectively, in the forward position as shown in Fig. 2 of the drawings.

It will be noted that the frame 1 is provided with stop portions 1c, limiting the forward movement of the hook 5, while the frame 2 is provided with a stop 2a limiting the forward movement of the hook 6. The juncture of the frames 1 and 2 also provides a stop 1d limiting the forward movement of the hook 7. Internally of the frame member 1 is provided a channel guide portion 1e in which the latch bar 12 is reciprocally mounted. In the frame member 2 is provided a similar opposed channel portion in which the opposite edge of the latch bar 12 is reciprocally mounted.

The operation of my releasable fishing hook is substantially as follows:

When this releasable fishing hook is cast into the water, the aromatic material from the absorbent pads 16 and 17 mixes with water passing through the frames 1 and 2, and may be sensed by fish in the vicinity of the releasable fishing hook. When the fish strike, the opposed relationship of the hooks 5 and 7 causes the fish to be securely caught and held, while the tension on the line 18 causes pivotal movement of the lever 13 over the pin 14, forcing the latch bar 12 to remain in firm engagement, at its end portion 12a, within the notch 7a, and corresponding notches in the hooks 5 and 7.

It will be noted that when load is applied axially of the frames 1 and 2 on the hooks 5, 6 and 7, respectively, opposite shear load at the notch portion 7a and corresponding notch portions of the hooks 5 and 7 is applied to the latch portion 12a of the latch bar 12, providing a very securing holding of the hooks 5, 6 and 7 by the latch bar 12 during the time tension is maintained on the line 18, which is connected to a conventional fishing pole.

When a fish is caught and brought to rest on the deck of a boat or the like, tension in the line 18 is released, while the spring 11 retracts the end 12a of the latch bar 12 from the hooks 5, 6 and 7, permitting them to pivot on the rivet 4 into substantially parallel position at their points rearwardly of the frames 1 and 2, whereby they are readily and easily pulled from the mouth of the fish. The saving of time and more security in catching of tuna or similar fish is of considerable value and is easily accomplished by use of my releasable fishing hook, as hereinbefore described.

It will be here noted that when it is desired to replenish the aromatic pads or material in the absorbent pads 16 and 17, the cap 3 may be removed, permitting access thereto.

Though I have shown and described a particular construction, combination and arrangement, I do not wish to be limited to this particular construction, combination and arrangement of parts and portions, but desire to include in the scope of my invention the construction, combination and arrangement of parts substantially as set forth in the appended claims.

Having thus described my invention, what I claim as new and desire to secure by Letters Patent is:

1. A frame, a plurality of hooks pivotally mounted on said frame on a common axis, latch means tending to hold said hooks in opposed extended relationship relative to said frame, a fishing line and means connected with said fishing line tending to release said latch from said hooks, permitting pivotal movement thereof when tension in said line decreases the pointed ends of said hooks being directed away from said common axis and pivotal into a position wherein said pointed ends extend away from said line nearly in axial coincidence therewith.

2. A frame, a plurality of hooks pivotally mounted on said frame on a common axis, latch means tending to hold said hooks in opposed extended relationship relative to said frame, a fishing line and means connected with said fishing line tending to release said latch from said hooks, permitting pivotal movement thereof when tension in said line decreases the pointed ends of said hooks being directed away from said common axis and pivotal into a position wherein said pointed ends extend away from said line nearly in axial coincidence therewith, said latch means comprising hub portions for said hooks, having notches therein, and a latch bar adapted to extend into the notches of said hub portions of said hooks.

3. A frame, a plurality of hooks pivotally mounted on said frame on a common axis, latch means tending to hold said hooks in opposed extended relationship relative to said frame, a fishing line and means connected with said fishing line tending to release said latch from said hooks, permitting pivotal movement thereof when tension in said line decreases the pointed ends of said hooks being directed away from said common axis and pivotal into a position wherein said pointed ends extend away from said line nearly in axial coincidence therewith, said latch means comprising hub portions for said hooks, having notches therein, and a latch bar adapted to extend into the notches of said hub portions of said hooks, said last-mentioned means comprising a spring and a lever connected with said fishing line.

4. A frame, a plurality of hooks pivotally mounted on said frame on a common axis, latch means tending to hold said hooks in opposed extended relationship relative to said frame, a fishing line and means connected with said fishing line tending to release said latch from said hooks, permitting pivotal movement thereof when tension in said line decreases the pointed ends of said hooks being directed away from said common axis and pivotal into a position wherein said pointed ends extend away from said line nearly in axial coincidence therewith, said latch means comprising hub portions for said hooks, having notches therein, and a latch bar adapted to extend into the notches of said hub portions of said hooks, said last-mentioned means comprising a spring and a lever connected with said fishing line, springs connected with said hooks tending to return them to laterally extended position relative to said frame for aligning the notch portions thereof with said latch bar.

ALFRED W. SILVA.

REFERENCES CITED

The following references are of record in the file of this patent:

UNITED STATES PATENTS

| Number | Name | Date |
|---|---|---|
| 330,793 | Lie | Nov. 17, 1885 |
| 519,684 | Goff et al. | May 8, 1894 |
| 635,547 | Howard | Oct. 24, 1894 |
| 1,588,690 | Babbitt | June 15, 1926 |
| 2,012,751 | Buch et al. | Aug. 27, 1935 |
| 2,091,457 | Sauer | Aug. 31, 1937 |
| 2,415,605 | Newby | Feb. 11, 1947 |
| 2,476,348 | Alvik et al. | July 19, 1949 |